United States Patent
Ino (10) Patent No.: US 9,268,325 B2
(45) Date of Patent: Feb. 23, 2016

(54) MANUFACTURING PROCESS MONITORING SYSTEM AND MANUFACTURING PROCESS MONITORING METHOD

(75) Inventor: Tomomi Ino, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 621 days.

(21) Appl. No.: 13/207,943

(22) Filed: Aug. 11, 2011

(65) Prior Publication Data

US 2012/0072002 A1 Mar. 22, 2012

(30) Foreign Application Priority Data

Sep. 17, 2010 (JP) .................................. 2010-208945

(51) Int. Cl.
*G06F 19/00* (2011.01)
*G05B 19/418* (2006.01)

(52) U.S. Cl.
CPC ........ *G05B 19/4184* (2013.01); *G05B 19/4183* (2013.01)

(58) Field of Classification Search
CPC ...................................... D01H 13/26
USPC ........................................... 700/110, 51, 143
See application file for complete search history.

(56) References Cited

U.S. PATENT DOCUMENTS 5,544,256 A * 8/1996 Brecher et al. ................ 382/149
2007/0239285 A1 * 10/2007 Good et al. ........................ 700/1

FOREIGN PATENT DOCUMENTS

| JP | 2004-232968 A | 8/2004 |
|---|---|---|
| JP | 2004-355330 A | 12/2004 |
| JP | 2009-9300 A | 1/2009 |

OTHER PUBLICATIONS

Hayashi et al., "A New Manufacturing Control System using Mahalanobis Distance for Maximising Productivity" 2001 IEEE International Semiconductor Manufacturing Symposium, Oct. 8-10, 2001, pp. 59-62.*
JP-2009-009300 to Matsutoshi, Japan Jan. 2009 (English translation appended to the end of Japanese Publication Document JP 2009-009300A).*
Perner, "Case-Based Reasoning on Images and Signals." Springer. Studies in Computational Intelligence vol. 73, 2008, 442 Pgs.*

(Continued)

*Primary Examiner* — Mohammad Ali
*Assistant Examiner* — Emilio J Saavedra
(74) *Attorney, Agent, or Firm* — Oblon, McClelland, Maier & Neustadt, L.L.P.

(57) ABSTRACT

According to one embodiment, a manufacturing process monitoring system for monitoring anomaly in a manufacturing process for products, the system includes an information storage section, a selection information section, a reference space formation section and a monitoring section. The information storage section is configured to store previously collected data. The selection information section is configured to create information used in classifying the data stored in the information storage section. The reference space formation section is configured to form a reference space based on data subjected to anomaly monitoring acquired in the manufacturing process and the data classified by the information from the data stored in the information storage section. The monitoring section is configured to monitor anomaly of the data subjected to anomaly monitoring based on the reference space.

9 Claims, 7 Drawing Sheets

(56) References Cited

OTHER PUBLICATIONS

Daisuke Inoue, et al., "Support for Drivers via Just-In-Time Predictive Control and Fault Detection Based on a Nearest Neighbor Method during Braking to Stop Trains", Transactions of the Japan Society of Mechanical Engineers, Series C, vol. 72, No. 721, Sep. 2006, pp. 2756-2761.

Office Action issued May 16, 2012, in Japanese Patent Application No. 2010-208945 with English translation.

* cited by examiner

MANUFACTURING PROCESS MONITORING SYSTEM AND MANUFACTURING PROCESS MONITORING METHOD

CROSS-REFERENCE TO RELATED APPLICATIONS

This application is based upon and claims the benefit of priority from the prior Japanese Patent Application No. 2010-208945, filed on Sep. 17, 2010; the entire contents of which are incorporated herein by reference.

FIELD

Embodiments described herein relate generally to a manufacturing process monitoring system and a manufacturing process monitoring method.

BACKGROUND

Statistical process control (SPC) based on Just-In-Time modeling is known as a manufacturing process monitoring method in manufacturing lines and the like.

According to Just-In-Time modeling, a plurality of data in the neighborhood of acquired data are used to create a reference space just in time. Hence, the time, effort, and management for updating the reference space can be reduced.

However, simply using a plurality of data in the neighborhood of acquired data may decrease the accuracy of monitoring anomalies.

BRIEF DESCRIPTION OF THE DRAWINGS

FIGS. 2A and 2B are schematic diagrams for illustrating the specifying of weighting factors, FIG. 2A illustrates the case where the target item is "data acquisition date", and FIG. 2B illustrates the case where the target item is "yield";

FIGS. 3A and 3B are schematic diagrams for illustrating the monitoring in the monitoring section, FIG. 3A illustrates the case where it is recognized that there is no anomaly, and FIG. 3B illustrates the case where it is recognized that there is an anomaly;

DETAILED DESCRIPTION

In general, according to one embodiment, a manufacturing process monitoring system for monitoring anomaly in a manufacturing process for products, the system includes an information storage section, a selection information section, a reference space formation section and a monitoring section. The information storage section is configured to store previously collected data. The selection information section is configured to create information used in classifying the data stored in the information storage section. The reference space formation section is configured to form a reference space based on data subjected to anomaly monitoring acquired in the manufacturing process and the data classified by the information from the data stored in the information storage section. The monitoring section is configured to monitor anomaly of the data subjected to anomaly monitoring based on the reference space.

In general, according to another embodiment, a manufacturing process monitoring method is disclosed for monitoring anomaly in a manufacturing process for products. The method can include acquiring data subjected to anomaly monitoring in the manufacturing process being executed. The method can include acquiring previously collected data. The method can include creating information used in classifying the previously collected data. The method can include forming a reference space based on the data subjected to anomaly monitoring and the data classified by the information from the previously collected data. In addition, the method can include monitoring anomaly of the data subjected to the anomaly monitoring based on the reference space.

Various embodiments will be described with reference to the accompanying drawings. In the drawings, similar components are labeled with like reference numerals, and the detailed description thereof is omitted appropriately.

First Embodiment

Figure 1:
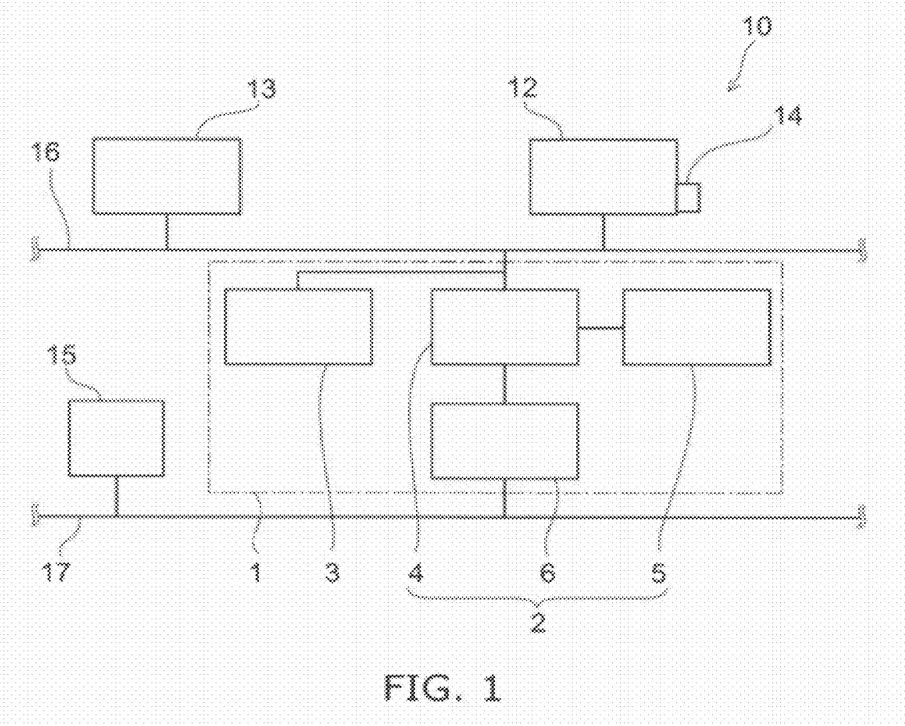
FIG. 1 is a block diagram for illustrating a manufacturing process monitoring system according to a first embodiment.

FIG. 1 is a block diagram for illustrating a manufacturing process monitoring system according to a first embodiment.

More specifically, FIG. 1 is a block diagram for illustrating the manufacturing process monitoring system provided on a manufacturing line.

As shown in FIG. 1, the manufacturing line 10 includes a manufacturing process monitoring system 1 according to the first embodiment, a processing apparatus 12, a control apparatus 13, a detection apparatus 14, a terminal section 15, a MES (manufacturing execution system) LAN (local area network) 16, and an FD (fault detection) system LAN 17. The monitoring system 1 includes a monitoring apparatus 2 and an information storage section 3.

The processing apparatus 12 and the control apparatus 13 are connected to the MES LAN 16. The terminal section 15 is connected to the FD system LAN 17.

The monitoring apparatus 2 is connected to the MES LAN 16 and the FD system LAN 17. The information storage section 3 and a reference space formation section 4 provided in the monitoring apparatus 2 are connected to the MES LAN 16. A monitoring section 6 provided in the monitoring apparatus 2 is connected to the FD system LAN 17.

The processing apparatus 12 can be e.g. an apparatus provided on the manufacturing line for electronic devices such as semiconductor devices and flat panel displays.

Examples of the processing apparatus 12 can include a plasma CVD (chemical vapor deposition) apparatus for forming thin films on silicon wafers and glass substrates. However, the processing apparatus 12 is not limited thereto, but can be modified appropriately.

The term "product" used herein refers to a member having been subjected to prescribed processing in the processing apparatus, and includes an intermediate product in addition to the so-called finished product. For instance, in the aforementioned example, the "product" also includes a silicon wafer or glass substrate with a thin film formed thereon.

The control apparatus 13 outputs commands for causing the processing apparatus 12 to execute a manufacturing process.

The detection apparatus 14 is provided on the processing apparatus 12. The detection apparatus 14 acquires data on the manufacturing process currently executed (the manufacturing process monitored for the occurrence of anomalies). Examples of the detection apparatus 14 can include those for detecting pressure, temperature, flow rate, voltage, current, electric power, frequency, light intensity, vibration, sound, or component ratio, and converting it to an electrical signal. However, the object detected by the detection apparatus 14 is not limited to those illustrated, but can be modified appropriately.

The data acquired by the detection apparatus 14 is provided to the monitoring apparatus 2 and the information storage section 3 through the processing apparatus 12.

The terminal section 15 is provided with a monitoring result, described later, from the monitoring system 1. The provided monitoring result is displayed on a display means, not shown, provided in the terminal section 15. The terminal section 15 can also include an input means, not shown, such as a keyboard.

The information storage section 3 provided in the monitoring system 1 stores previously collected data, and successively stores data provided from the detection apparatus 14. Furthermore, the information storage section 3 provides the previously collected data to the reference space formation section 4 provided in the monitoring apparatus 2.

The monitoring apparatus 2 monitors the occurrence of anomalies based on the data provided from the detection apparatus 14 and the previously collected data provided from the information storage section 3. The details on the monitoring of anomaly occurrence will be described later.

Next, the monitoring apparatus 2 is further illustrated.

The monitoring apparatus 2 includes a reference space formation section 4, a selection information section 5, and a monitoring section 6.

The reference space formation section 4 forms a reference space (also referred to as unit space) based on the data subjected to anomaly monitoring acquired by the detection apparatus 14 and the previously collected data provided from the information storage section 3. Here, the reference space formation section 4 classifies the data provided from the information storage section 3 by using weighting factors provided from the selection information section 5, and forms a reference space from the classified data.

That is, the reference space formation section 4 forms a reference space based on the data subjected to anomaly monitoring acquired in the manufacturing process and the data classified from the data stored in the information storage section 3 by using weighting factors.

The selection information section 5 creates weighting factors and provides the created weighting factors to the reference space formation section 4. In the embodiment, the weighting factors constitute the information used in classifying data stored in the information storage section 3.

The monitoring section 6 performs anomaly monitoring on the data subjected to anomaly monitoring acquired by the detection apparatus 14 based on the reference space formed by the reference space formation section 4. For instance, the monitoring section 6 can recognize the data subjected to anomaly monitoring acquired by the detection apparatus 14 as anomalous when the data is not included in the reference space.

Next, the creation of weighting factors in the selection information section 5 is illustrated.

Examples of target items in creating weighting factors can include "data acquisition date", "yield", and "items on product quality etc."

Here, examples of the "items on product quality etc." can include "finished quality" and "amount of attached particles".

Furthermore, different weighting factors can be specified for each target item.

For instance, in the case where the target item is "data acquisition date", the weighting factors can be specified so that in classifying data, more recent data is classified with higher priority.

In the case where the target item is "yield", the weighting factors can be specified so that in classifying data, data having resulted in higher yield is classified with higher priority.

In the case where the target item is "finished quality", the weighting factors can be specified so that in classifying data, data having resulted in better finished quality is classified with higher priority.

In the case where the target item is "amount of attached particles", the weighting factors can be specified so that in classifying data, data having resulted in smaller amount of attached particles is classified with higher priority.

Here, the specifying of weighting factors is described with the cases of "data acquisition date" and "yield" taken as an example.

Figure 2A:
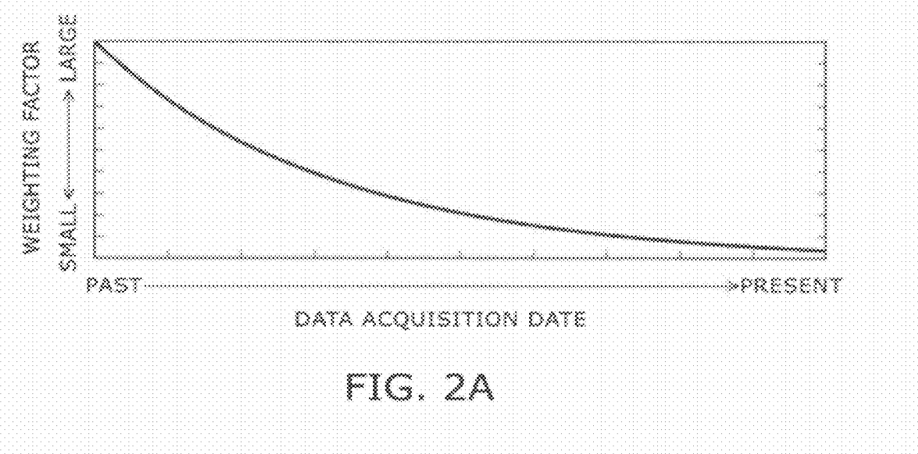
Figure 2B:
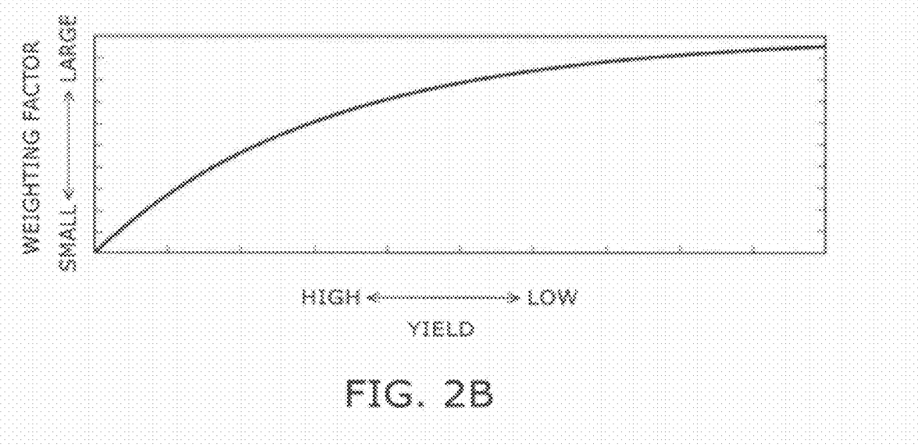

FIGS. 2A and 2B are schematic diagrams for illustrating the specifying of weighting factors. Here, FIG. 2A is a schematic diagram for illustrating the case where the target item is "data acquisition date". FIG. 2B is a schematic diagram for illustrating the case where the target item is "yield".

In the case where the target item is "data acquisition date", for instance, as shown in FIG. 2A, the value of the weighting factor can be made smaller for more recent data.

In the case where the target item is "yield", for instance, as shown in FIG. 2B, the value of the weighting factor can be made smaller for data having resulted in higher yield.

In FIGS. 2A and 2B, the case of nonlinearly changing the value of the weighting factor is illustrated. However, the value of the weighting factor is not limited thereto. For instance, the value of the weighting factor can be changed linearly, or changed stepwise. In this case, for each target item, the form of change of the value of the weighting factor can be modified appropriately.

Furthermore, different items can be appropriately combined to specify weighting factors. For instance, in the case of combining "data acquisition date" and "yield", the value of the weighting factor can be made smaller for more recent data having resulted in higher yield.

The information required in creating weighting factors can be provided from an input section, not shown, through the MES LAN 16, the FD system LAN 17 and the like to the selection information section 5.

The weighting factors thus created are provided to the reference space formation section 4 and used to classify data to be used in forming a reference space.

As described above, the reference space formation section 4 forms a reference space based on the data provided from the information storage section 3. Here, the reference space could be formed by using all the data provided from the information storage section 3. However, this may complicate computation processing, or the reference space may be formed with inappropriate data mixed therein.

Thus, in the embodiment, the data provided from the information storage section 3 is classified by using the weighting factors provided from the selection information section 5. The reference space is formed from the classified data.

TABLE 1 illustrates the classifying of data using the weighting factors.

Here, TABLE 1 illustrates the case of classifying data using the weighting factors for "data acquisition date". The "distance" in TABLE 1 represents the distance between the data subjected to anomaly monitoring acquired by the detection apparatus 14 and each data provided from the information storage section 3.

TABLE 1

| Lot number | Data acquisition date | Distance | Weighting factor | Distance × weighting factor |
|---|---|---|---|---|
| x1 | present | L1 | 1 | 1 × L1 |
| x2 | ↑ | L2 | 1.1 | 1.1 × L2 |
| x3 | | L3 | 1.2 | 1.2 × L3 |
| x4 | | L4 | 1.3 | 1.3 × L4 |
| x5 | | L5 | 1.4 | 1.4 × L5 |
| x6 | | L6 | 1.5 | 1.5 × L6 |
| x7 | | L7 | 1.6 | 1.6 × L7 |
| x8 | | L8 | 1.7 | 1.7 × L8 |
| x9 | | L9 | 1.8 | 1.8 × L9 |
| x10 | | L10 | 1.9 | 1.9 × L10 |
| x11 | ↓ | L11 | 2 | 2 × L11 |
| : | past | : | : | : |

In the case illustrated in TABLE 1, the data used in forming a reference space is classified based on the product of the "distance" and the value of the weighting factor.

Here, in classifying data used in forming a reference space, the data having smaller "distance" can be classified with higher priority. However, the data subjected to anomaly monitoring may be different from old data in conditions and environments in which the data is acquired. Thus, preferably, the data having smaller "distance" and acquired more recently is classified with higher priority.

In this case, the product of the "distance" and the value of the weighting factor becomes smaller as the "distance" becomes smaller (closer to the data subjected to anomaly monitoring) and the value of the weighting factor becomes smaller (the data being acquired more recently).

Thus, by using the product of the "distance" and the value of the weighting factor, the data having smaller "distance" and acquired more recently can be classified with higher priority.

In this case, a prescribed number of data can be selected sequentially from the data having the smallest product of the "distance" and the value of the weighting factor.

Here, the relationship between the "distance" and "data acquisition date" can be controlled by the numerical range of the weighting factors.

For instance, in the case where the "distance" is more important in classifying data, the numerical range of the weighting factors can be made smaller and narrower.

As described above, in forming a reference space, the reference space formation section 4 classifies data used in forming a reference space from the data stored in the information storage section 3 based on the priority associated with the weighting factors.

The reference space formation section 4 forms a reference space including the classified data.

The monitoring section 6 performs anomaly monitoring on the data subjected to anomaly monitoring based on the reference space formed by the reference space formation section 4.

Figure 3A:
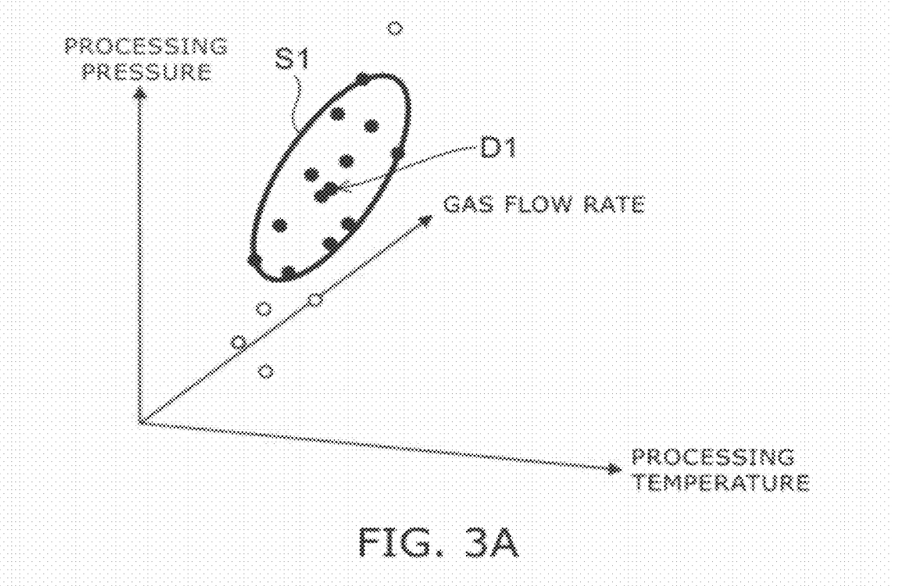
Figure 3B:
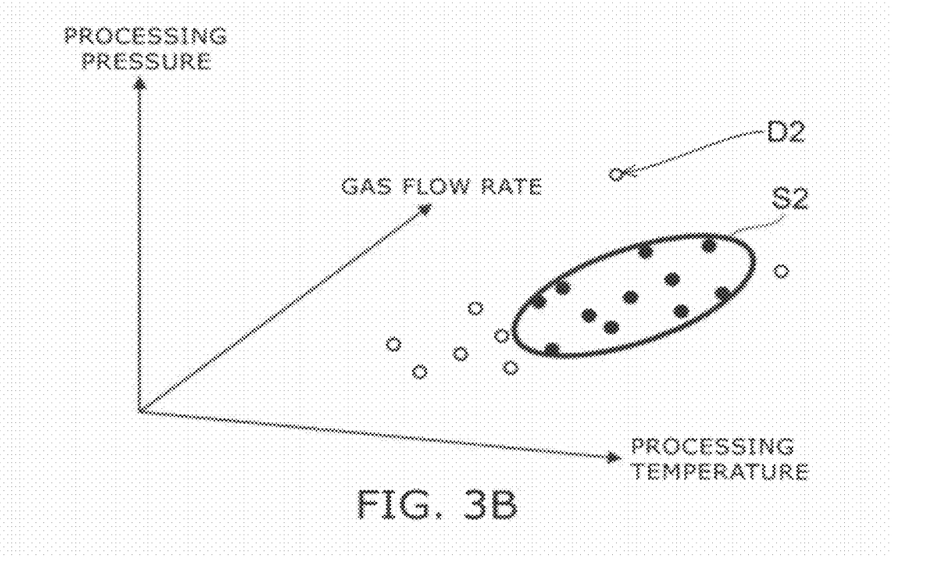

FIGS. 3A and 3B are schematic diagrams for illustrating the monitoring in the monitoring section. More specifically, FIG. 3A is a schematic diagram for illustrating the case where it is recognized that there is no anomaly. FIG. 3B is a schematic diagram for illustrating the case where it is recognized that there is an anomaly. Here, in the cases illustrated in FIGS. 3A and 3B, anomaly monitoring is performed on the data about processing pressure, processing temperature, and gas flow rate.

In the case shown in FIG. 3A, data D1 is determined based on the value of processing pressure, the value of processing temperature, and the value of gas flow rate acquired by the detection apparatus 14. Then, a reference space S1 is formed based on the product of the "distance" from the data D1 and the value of weighting factors.

In anomaly monitoring, the presence or absence of anomalies can be recognized by detecting whether or not the data D1 is included in the reference space S1. For instance, in the case shown in FIG. 3A, the data D1 is included in the reference space S1. Hence, it can be recognized that there is no anomaly.

In the case shown in FIG. 3B, data D2 is determined based on the value of processing pressure, the value of processing temperature, and the value of gas flow rate acquired by the detection apparatus 14. Then, a reference space S2 is formed based on the product of the "distance" from the data D2 and the value of weighting factors.

In anomaly monitoring, the presence or absence of anomalies can be monitored by detecting whether or not the data D2 is included in the reference space S2. For instance, in the case shown in FIG. 3B, the data D2 is not included in the reference space S2. Hence, it can be recognized that there is an anomaly.

Next, the operation of the manufacturing process monitoring system 1 is illustrated.

First, data on the manufacturing process currently executed in the processing apparatus 12 is acquired by the detection apparatus 14.

The data acquired by the detection apparatus 14 is provided to the information storage section 3 through the MES LAN 16. The provided data is stored in the information storage section 3.

The data acquired by the detection apparatus 14 is provided also to the reference space formation section 4 through the MES LAN 16.

The reference space formation section 4 is provided with previously collected data from the information storage section 3. Furthermore, the reference space formation section 4 is provided with weighting factors from the selection information section 5.

The reference space formation section 4 forms a reference space based on the data provided from the detection apparatus 14 and the data provided from the information storage section 3. Here, the reference space formation section 4 classifies the data provided from the information storage section 3 using the weighting factors provided from the selection information section 5, and forms a reference space from the classified data.

Next, the monitoring section 6 performs anomaly monitoring on the data acquired by the detection apparatus 14 (the data subjected to anomaly monitoring) based on the reference space formed by the reference space formation section 4. In this case, the presence or absence of anomalies can be monitored by detecting whether or not the data acquired by the detection apparatus 14 is included in the reference space.

The monitoring result obtained by the monitoring section 6 is provided to the terminal section 15 and the like through the FD system LAN 17.

The monitoring result provided to the terminal section 15 is displayed on a display means, not shown, provided in the terminal section 15. In the case of the monitoring result that there is an anomaly, an alarm can be displayed on the display means, not shown, provided in the terminal section 15.

According to the embodiment, in forming a reference space, data can be classified by using the weighting factors provided from the selection information section 5. Hence, the reference space can be formed with inappropriate data excluded. Thus, the accuracy of monitoring anomalies can be improved.

Second Embodiment

Figure 4:
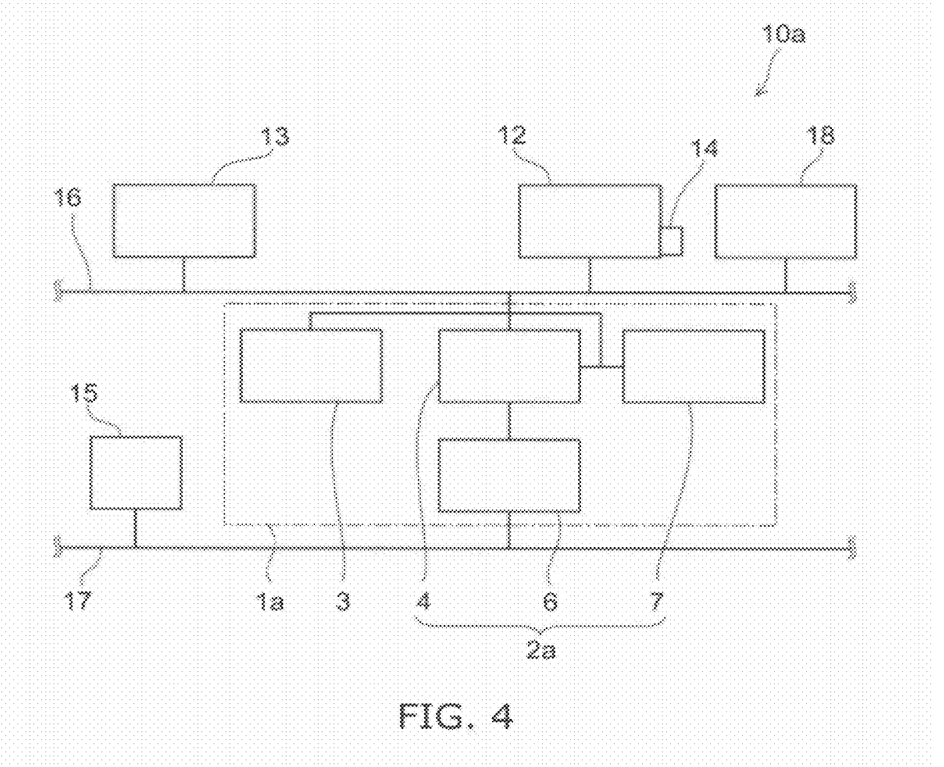
FIG. 4 is a block diagram for illustrating a manufacturing process monitoring system according to a second embodiment.

FIG. 4 is a block diagram for illustrating a manufacturing process monitoring system according to a second embodiment.

More specifically, FIG. 4 is a block diagram for illustrating the manufacturing process monitoring system provided on a manufacturing line.

As shown in FIG. 4, the manufacturing line 10a includes a manufacturing process monitoring system 1a according to the second embodiment, a processing apparatus 12, a control apparatus 13, a detection apparatus 14, a terminal section 15, an inspection apparatus 18, a MES LAN 16, and an FD system LAN 17.

The monitoring system 1a includes a monitoring apparatus 2a and an information storage section 3.

The inspection apparatus 18 is connected to the MES LAN 16.

The inspection apparatus 18 can be an apparatus for inspecting products processed by the processing apparatus 12. Examples of the inspection apparatus 18 can include those for inspecting the dimension, weight, shape, defects, finished quality, amount of attached particles and the like of the product processed by the processing apparatus 12. However, the inspection apparatus 18 is not limited to the inspection apparatus for inspecting the items illustrated, but can be any of various inspection apparatuses for inspecting products processed by the processing apparatus 12.

The inspection result obtained by the inspection apparatus 18 and the information on the inspected product (e.g., information on the manufacturing lot) are provided to the selection information section 7, described later, through the MES LAN 16.

The monitoring apparatus 2a includes a reference space formation section 4, a selection information section 7, and a monitoring section 6.

The selection information section 7 stores the inspection result obtained by the inspection apparatus 18 and the information on the inspected product. Furthermore, the selection information section 7 creates information on the products determined to be defective and provides it to the reference space formation section 4. In the embodiment, the information on the products determined to be defective constitutes information used in classifying data stored in the information storage section 3.

Here, the function of the selection information section 7 can be served by the information storage section 3.

In such cases, the portion of the information storage section 3 having the function of the selection information section 7 constitutes a selection information section.

The reference space formation section 4 forms a reference space based on the data provided from the information storage section 3. Here, the reference space could be formed by using all the data provided from the information storage section 3. However, this may complicate computation processing, or the reference space may be formed in the state in which data on the products determined to be defective is mixed therein.

Figure 5:
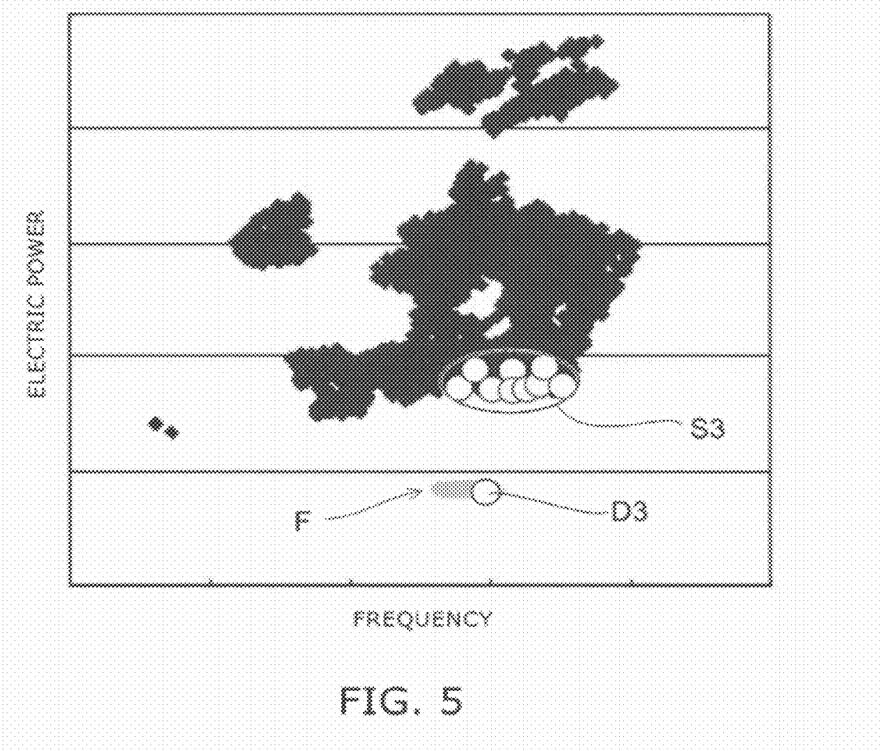
FIG. 5 is a schematic graph for illustrating the forming of a reference space.

FIG. 5 is a schematic graph for illustrating the forming of a reference space.

Here, as an example, it is assumed that the target data relates to electric power and frequency.

As described above, the data provided from the information storage section 3 may be mixed with data F on the products determined to be defective.

In the embodiment, information on the products determined to be defective is provided from the selection information section 7. Hence, in forming a reference space, use of the data F can be avoided.

For instance, data D3 is determined based on the value of electric power and the value of frequency acquired by the detection apparatus 14. In this case, the group of data F is located at a close "distance" from the data D3. However, use of the data F can be avoided in forming a reference space based on the information provided from the selection information section 7.

Thus, in the case illustrated in FIG. 5, the reference space S3 can be formed by using a prescribed number of data located at a close "distance" from the data D3 except the group of data F.

That is, in forming a reference space, the reference space formation section 4 excludes the data F corresponding to the information on the products determined to be defective from the data stored in the information storage section 3.

Then, in anomaly monitoring in the monitoring section 6, the presence or absence of anomalies can be monitored by detecting whether or not the data D3 is included in the reference space S3. For instance, in the case shown in FIG. 5, the data D3 is not included in the reference space S3. Hence, it can be recognized that there is an anomaly.

If it is recognized that the data D3 is anomalous, data close to the data D3 can be extracted from the group of data F.

Figure 6:
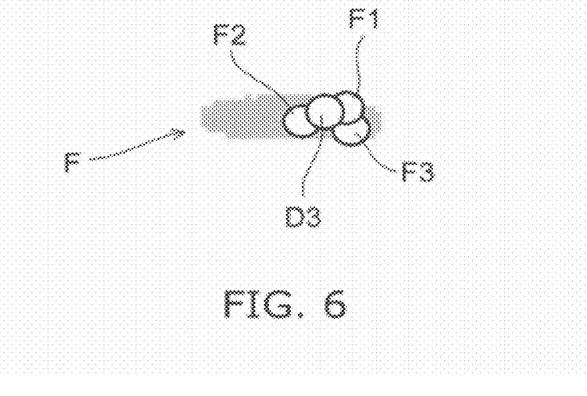
FIG. 6 is a schematic view for illustrating the situation in which data close to the data D3 is extracted from the group of data F.

FIG. 6 is a schematic view for illustrating the situation in which data close to the data D3 is extracted from the group of data F.

As shown in FIG. 6, data F1-F3 close to the data D3 is extracted from the group of data F on the products determined to be defective. The extraction of the data F1-F3 can be performed by using e.g. the K-nearest neighbor method.

Then, in conjunction with the monitoring result obtained by the monitoring section 6, information on the extracted data F1-F3 (e.g., information on the manufacturing lot) can be provided to the terminal section 15 and the like through the FD system LAN 17.

The monitoring result and the information on the data F1-F3 close to the data D3 recognized as anomalous provided to the terminal section 15 are displayed on a display means, not shown, provided in the terminal section 15.

In the case of the monitoring result that there is an anomaly, an alarm can be displayed on the display means, not shown, provided in the terminal section 15. Here, the information on the data F1-F3 can be displayed in combination. This facilitates learning e.g. the causes of and countermeasures against defects which occurred previously in similar conditions.

Next, the operation of the manufacturing process monitoring system 1a is illustrated.

First, data on the manufacturing process currently executed in the processing apparatus 12 is acquired by the detection apparatus 14.

The data acquired by the detection apparatus 14 is provided to the information storage section 3 through the MES LAN 16. The provided data is stored in the information storage section 3.

The data acquired by the detection apparatus 14 is provided also to the reference space formation section 4 through the MES LAN 16.

The reference space formation section 4 is provided with previously collected data from the information storage section 3. Furthermore, the reference space formation section 4 is provided with information on the products determined to be defective from the selection information section 7.

The reference space formation section 4 forms a reference space based on the data provided from the detection apparatus 14 and the data provided from the selection information section 7. In forming a reference space, the reference space formation section 4 avoids use of the data F corresponding to the information on the products determined to be defective.

Next, the monitoring section 6 performs anomaly monitoring on the data acquired by the detection apparatus 14 based on the reference space formed by the reference space formation section 4. In this case, the presence or absence of anomalies can be monitored by detecting whether or not the data acquired by the detection apparatus 14 is included in the reference space.

The monitoring result obtained by the monitoring section 6 is provided to the terminal section 15 and the like through the FD system LAN 17.

The monitoring result provided to the terminal section 15 is displayed on a display means, not shown, provided in the terminal section 15. In the case of the monitoring result that there is an anomaly, an alarm can be displayed on the display means, not shown, provided in the terminal section 15. Furthermore, data close to the data determined to be anomalous can be extracted, and information on the extracted data can also be displayed in combination.

According to the embodiment, information on the products determined to be defective is provided from the selection information section 7. Thus, use of the data F corresponding to the information on the products determined to be defective can be avoided in forming a reference space. Hence, the reference space can be formed in the state in which the data on the products determined to be defective is excluded. Thus, the accuracy of monitoring anomalies can be improved. Furthermore, data close to the data determined to be anomalous can be extracted, and information on the extracted data can be outputted in combination. This facilitates learning e.g. the causes of and countermeasures against defects which occurred previously in similar conditions.

In the cases illustrated above, the selection information section 5 and the selection information section 7 are provided separately. However, the selection information section 5 and the selection information section 7 can be provided in combination.

Third Embodiment

Next, a manufacturing process monitoring method according to a third embodiment is illustrated.

Figure 7:
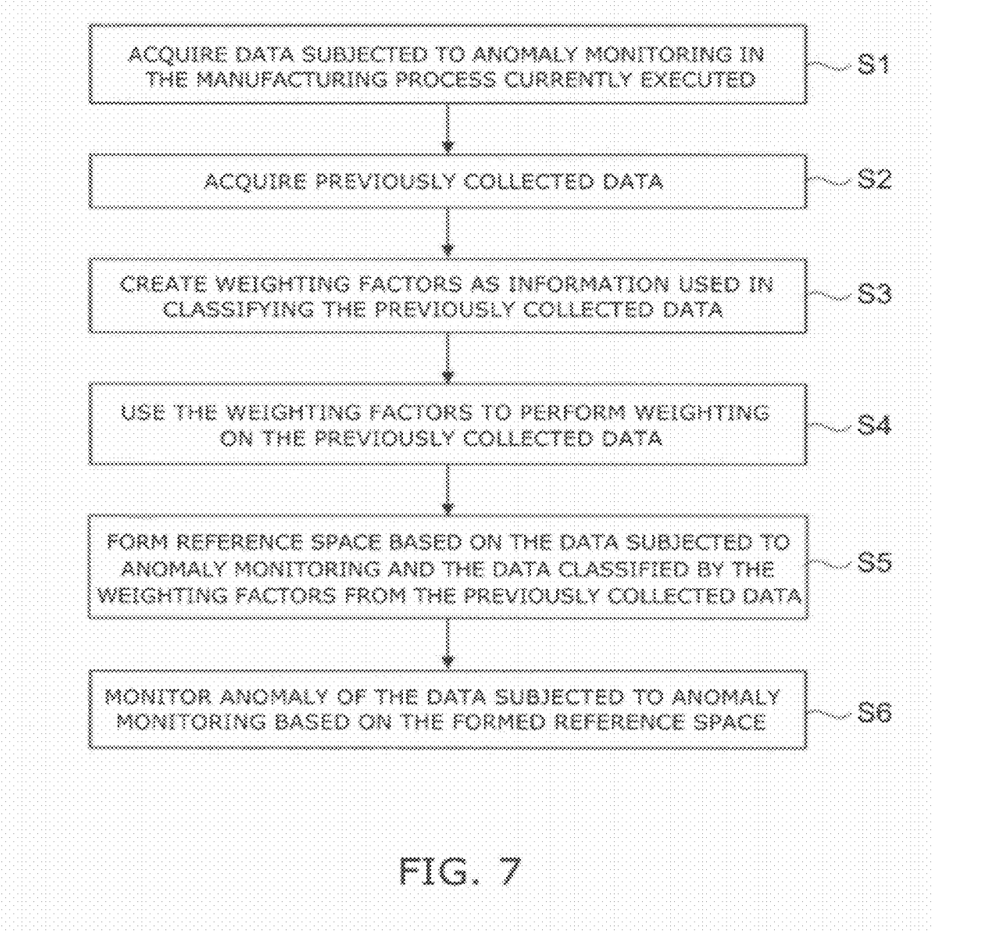
FIG. 7 is a flow chart for illustrating a manufacturing process monitoring method according to a third embodiment.

FIG. 7 is a flow chart for illustrating the manufacturing process monitoring method according to the third embodiment.

First, data subjected to anomaly monitoring in the manufacturing process currently executed is acquired (step S1).

Previously collected data is acquired (step S2).

Weighting factors are created as information used in classifying the previously collected data (step S3).

The weighting factors are used to perform weighting on the previously collected data (step S4).

A reference space is formed based on the data subjected to anomaly monitoring and the data classified by the weighting factors from the previously collected data (step S5).

Accordingly, the data can be classified by using the weighting factors in forming a reference space.

That is, in forming a reference space, data used in forming a reference space is classified from the previously collected data based on the priority associated with the weighting factors.

Anomaly of the data subjected to anomaly monitoring is monitored based on the formed reference space (step S6).

In anomaly monitoring, if it is determined that there is an anomaly, an alarm can be issued.

Here, weighting with weighting factors, forming of a reference space, and anomaly monitoring based on the reference space, for instance, can be made similar to those described above, and hence the detailed description thereof is omitted.

According to the embodiment, in forming a reference space, data can be classified by using the weighting factors. Hence, the reference space can be formed with inappropriate data excluded. Thus, the accuracy of monitoring anomalies can be improved.

Fourth Embodiment

Next, a manufacturing process monitoring method according to a fourth embodiment is illustrated.

Figure 8:
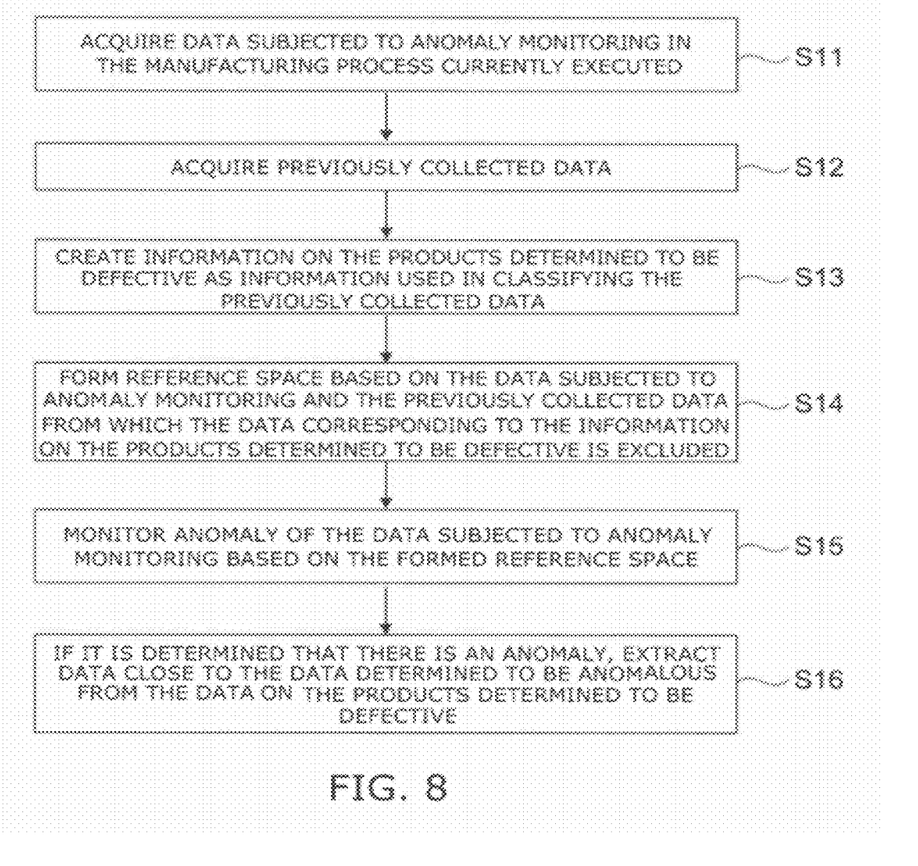
FIG. 8 is a flow chart for illustrating a manufacturing process monitoring method according to a fourth embodiment.

FIG. 8 is a flow chart for illustrating the manufacturing process monitoring method according to the fourth embodiment.

First, data subjected to anomaly monitoring in the manufacturing process currently executed is acquired (step S11).

Previously collected data is acquired (step S12).

Information on the products determined to be defective is created as information used in classifying the previously collected data (step S13).

A reference space is formed based on the data subjected to anomaly monitoring and the previously collected data from which the data corresponding to the information on the products determined to be defective is excluded (step S14).

Anomaly of the data subjected to anomaly monitoring is monitored based on the formed reference space (step S15).

In anomaly monitoring, if it is determined that there is an anomaly, an alarm can be issued.

Furthermore, if it is determined that there is an anomaly, data close to the data determined to be anomalous is extracted from the data on the products determined to be defective (step S16).

In this case, step S16 is not necessarily needed. However, data close to the data determined to be anomalous can be extracted, and information on the extracted data can be outputted in combination. This facilitates learning e.g. the causes of and countermeasures against defects which occurred previously in similar conditions.

Here, excluding of data corresponding to the information on the products determined to be defective in forming a reference space, forming of a reference space, anomaly monitoring based on the reference space, and extracting of data close to the data determined to be anomalous, for instance, can be made similar to those described above, and hence the detailed description thereof is omitted.

According to the embodiment, use of the data on the products determined to be defective can be avoided in forming a reference space. Hence, the reference space can be formed in the state in which the data on the products determined to be defective is excluded. Thus, the accuracy of monitoring anomalies can be improved. Furthermore, data close to the data determined to be anomalous can be extracted, and information on the extracted data can be outputted in combination. This facilitates learning e.g. the causes of and countermeasures against defects which occurred previously in similar conditions.

In the cases illustrated above, weighting with weighting factors and excluding of data on the products determined to be defective are performed separately. However, weighting with weighting factors and excluding of data on the products determined to be defective can be performed in combination.

Next, a manufacturing process monitoring program is illustrated.

The manufacturing process monitoring program according to the embodiments can cause a computer to execute the above manufacturing process monitoring method.

For execution of the sequence of the manufacturing process monitoring method, the manufacturing process monitoring program according to the embodiments is stored in e.g. a storage section provided in the computer. The manufacturing process monitoring program is supplied to the computer in the state of e.g. being stored on a recording medium. Thus, the manufacturing process monitoring program can be read from the recording medium and stored in the storage section provided in the computer. Alternatively, the manufacturing process monitoring program can be stored in the storage section provided in the computer through e.g. the MES LAN 16.

Fifth Embodiment

The manufacturing process monitoring program according to a fifth embodiment can execute the following procedures illustrated in FIG. 7.

(1) The procedure of acquiring data subjected to anomaly monitoring in the manufacturing process currently executed.

(2) The procedure of acquiring previously collected data.

(3) The procedure of creating weighting factors as information used in classifying the previously collected data.

(4) The procedure of using the weighting factors to perform weighting on the previously collected data.

(5) The procedure of forming a reference space based on the data subjected to anomaly monitoring and the data classified by the weighting factors from the previously collected data.

Accordingly, the data can be classified by using the weighting factors in forming a reference space.

(6) The procedure of monitoring anomaly of the data subjected to anomaly monitoring based on the formed reference space.

In anomaly monitoring, if it is determined that there is an anomaly, an alarm can be issued.

Here, weighting with weighting factors, forming of a reference space, and anomaly monitoring based on the reference space, for instance, can be made similar to those described above, and hence the detailed description thereof is omitted.

According to the embodiment, in forming a reference space, data can be classified by using the weighting factors. Hence, the reference space can be formed with inappropriate data excluded. Thus, the accuracy of monitoring anomalies can be improved.

Sixth Embodiment

The manufacturing process monitoring program according to a sixth embodiment can execute the following procedures illustrated in FIG. 8.

(11) The procedure of acquiring data subjected to anomaly monitoring in the manufacturing process currently executed.

(12) The procedure of acquiring previously collected data.

(13) The procedure of creating information on the products determined to be defective as information used in classifying the previously collected data.

(14) The procedure of forming a reference space based on the data subjected to anomaly monitoring and the previously collected data from which the data corresponding to the information on the products determined to be defective is excluded.

(15) The procedure of monitoring anomaly of the data subjected to anomaly monitoring based on the formed reference space.

In anomaly monitoring, if it is determined that there is an anomaly, an alarm can be issued.

(16) The procedure of extracting data close to the data determined to be anomalous from the data on the products determined to be defective if it is determined that there is an anomaly.

In this case, the procedure described in (16) is not necessarily needed. However, data close to the data determined to be anomalous can be extracted, and information on the extracted data can be outputted in combination. This facilitates learning e.g. the causes of and countermeasures against defects which occurred previously in similar conditions.

Here, excluding of data corresponding to the information on the products determined to be defective in forming a reference space, forming of a reference space, anomaly monitoring based on the reference space, and extracting of data close to the data determined to be anomalous, for instance, can be made similar to those described above, and hence the detailed description thereof is omitted.

According to the embodiment, use of the data on the products determined to be defective can be avoided in forming a reference space. Hence, the reference space can be formed in the state in which the data on the products determined to be defective is excluded. Thus, the accuracy of monitoring anomalies can be improved. Furthermore, data close to the data determined to be anomalous can be extracted, and information on the extracted data can be outputted in combination. This facilitates learning e.g. the causes of and countermeasures against defects which occurred previously in similar conditions.

In the cases illustrated above, weighting with weighting factors and excluding of data on the products determined to be defective are performed separately. However, weighting with weighting factors and excluding of data on the products determined to be defective can be performed in combination.

Seventh Embodiment

Next, a method for manufacturing an electronic device according to a seventh embodiment is described.

The method for manufacturing an electronic device according to the seventh embodiment can be based on at least one of the manufacturing process monitoring systems, the manufacturing process monitoring methods, and the manufacturing process monitoring programs described above.

Examples of the method for manufacturing an electronic device can include a method for manufacturing a semiconductor device and a method for manufacturing a flat panel display.

Here, as an example, a method for manufacturing a semiconductor device is illustrated.

In the process for manufacturing a semiconductor device, the so-called upstream process includes the step of forming a pattern on a substrate (wafer) surface by e.g. film formation, resist application, exposure, development, etching, and resist removal, the inspection step, the cleaning step, the heat treatment step, the impurity doping step, the diffusion step, and the planarization step. Furthermore, the so-called downstream process includes the assembly step including dicing, mounting, bonding, and sealing, and the inspection step for functionality and reliability.

Thus, the manufacturing process executed in each step can be monitored by using at least one of the manufacturing process monitoring systems, the manufacturing process monitoring methods, and the manufacturing process monitoring programs described above.

Here, the manufacturing process monitoring system, the manufacturing process monitoring method, and the manufacturing process monitoring program can be made similar to those described above, and hence the detailed description thereof is omitted.

Furthermore, each step in the method for manufacturing an electronic device can be based on known techniques, and hence the detailed description thereof is also omitted.

According to the embodiment, the accuracy of monitoring anomalies in the method for manufacturing an electronic device can be improved. Furthermore, data close to the data determined to be anomalous can be extracted, and information on the extracted data can be outputted in combination. This facilitates learning e.g. the causes of and countermeasures against defects which occurred previously in similar conditions.

Thus, the yield and productivity of products, for instance, can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A manufacturing process monitoring system for monitoring anomalies in a manufacturing process for products, the system comprising:
    an information storage section configured to store data collected from plural lots of a manufactured product as previously collected data;
    a selection information section configured to create a value of a weighting factor, wherein the value of the weighting factor pertains to a product yield for each lot of the manufactured product and establishes a priority associated with the weighting factors when classifying the previously collected data, wherein a higher yield is classified with a higher priority;
    a detection apparatus configured to acquire data in the manufacturing process that is subjected to anomaly monitoring;
    a reference space formation section configured to classify the previously collected data provided from the information storage section to produce classified data by using a product of a distance and the value of the weighting factor, the reference space formation section configured to form a reference space based on the classified data, the distance being between the data subjected to anomaly monitoring and each of the previously collected data provided from the information storage section; and
    a monitoring section configured to monitor anomalies of the data subjected to anomaly monitoring based on the reference space.

2. The system according to claim 1, further comprising:
    an inspection apparatus configured to inspect a product, the selection information section creating information on the product determined to be defective based on a result of the inspection, the reference space formation section excluding from the classified data, data of the previously collected data which corresponds to the information on the product determined to be defective, the reference space formation section forming the reference space based on the remaining classified data.

3. The system according to claim 1, wherein
    the reference space formation section forms the reference space so that the reference space includes the classified data.

4. The system according to claim 1, wherein
    the value of the weighting factor becomes smaller as the priority becomes higher, and
    the reference space formation section uses a predetermined number of data from the classified data having the smallest products of the distance and the value of the weighting factor to form the reference space.

5. A manufacturing process monitoring method for monitoring anomalies in a manufacturing process for products, the method comprising:
    acquiring data that is subjected to anomaly monitoring in a manufacturing process being executed;
    acquiring data collected from plural lots of a manufactured product as previously collected data;
    creating a value of a weighting factor, wherein the value of the weighting factor pertains to a product yield for each lot of the manufactured product and establishes a priority associated with the weighting factors when classifying the previously collected data, wherein a higher yield is classified with a higher priority;
    classifying the previously collected data to produce classified data by using a product of a distance and the value of the weighting factor, and forming a reference space based on the classified data, the distance being between the data subjected to anomaly monitoring and each of the previously collected data;
    and
    monitoring anomalies of the data subjected to anomaly monitoring based on the reference space.

6. The method according to claim 5, further comprising:
    displaying a result of a recognized anomaly and information on extracted data in combination on a display section.

7. The method according to claim 5, further comprising:
    inspecting a product, creating information on the product determined to be defective based on a result of the inspection, excluding from the classified data, data of the previously collected data which corresponds to the information on the product determined to be defective, in the forming the reference space, the reference space formed based on the remaining classified data.

8. The method according to claim 5, wherein
    in the forming the reference space, the reference space is formed so that the reference space includes the classified data.

9. The method according to claim 5, wherein
the value of the weighting factor becomes smaller as the priority becomes higher,
in the forming the reference space, a predetermined number of data from the classified data having the smallest products of the distance and the value of the weighting factor is used to form the reference space.

* * * * *